INVENTOR
ETHAN W.P. FRANZ,
BY
ATTORNEY

June 6, 1961

E. W. P. FRANZ 2,987,167

BELT CONVEYOR STRUCTURES

Filed Oct. 10, 1957

INVENTOR
ETHAN W.P. FRANZ,
BY
ATTORNEY

June 6, 1961 E. W. P. FRANZ 2,987,167
BELT CONVEYOR STRUCTURES
Filed Oct. 10, 1957 7 Sheets-Sheet 5

INVENTOR
ETHAN W. P. FRANZ,
BY
ATTORNEY

June 6, 1961  E. W. P. FRANZ  2,987,167
BELT CONVEYOR STRUCTURES
Filed Oct. 10, 1957  7 Sheets-Sheet 7

INVENTOR
ETHAN W.P. FRANZ,
BY
ATTORNEY

United States Patent Office 2,987,167
Patented June 6, 1961

2,987,167
BELT CONVEYOR STRUCTURES
Ethan W. P. Franz, Cleveland Heights, Ohio, assignor, by mesne assignments, to Ruth R. Young and G. H. Meyfarth, Jr.
Filed Oct. 10, 1957, Ser. No. 689,306
4 Claims. (Cl. 198—195)

This invention relates to endless belt conveyor structures and more particularly to an improved link conveyor belt formed of a plurality of longitudinally serially arranged links especially constructed and hingedly secured together to provide a substantially continuous flat or curvilinear surface of greater load-supporting capacity and improved safe operating quality.

Endless conveyors of various types have been built with hingedly secured links for providing substantially continuous load-supporting surfaces and are widely used for transferring ore, coal, grain, packages, and other articles, during processing or transference of such materials from one locality to another. In order to minimize damage to the material being conveyed, as well as to the belt, various configurations of the links of such belts have been provided. It has been found, however, that in conveying certain types of materials it is desirable that the continuous belt surface should be substantially flat or substantially continuous curvilinear, with a minimum of depressions or spaces between the belt links and in the configuration of each belt link. Such a structure minimizes the entrance of foreign material, such as parts of the material which is being conveyed, into the interior of the belt. It also minimizes the possibility of injury to personnel working around such a belt.

Special conveyor constructions have been used in the past which were intended to eliminate or minimize gaps and open spaces between the links forming the endless belt of a conveyor. These have generally required that the links be of rather special and complicated construction, resulting in a relatively expensive initial conveyor cost and requiring relatively expensive maintenance. The special configurations of the links also often resulted in relatively low load-supporting capacities for such belt conveyors.

It is an object of this invention to provide an improved link type endless belt conveyor of improved and simplified construction which will provide a stronger and safer belt with a substantially continuous flat or curvilinear surface.

Another object of this invention is to provide an improved and simplified conveyor mechanism having an endless link belt with a substantially continuous load-supporting surface which greatly facilitates diverting or plowing off small articles from the belt.

A further object of this invention is to provide an improved and simplified conveyor comprising an endless link belt with a substantially continuous load-supporting surface for use substantially flush with adjacent floor surfaces.

An additional object of this invention is to provide a simplified and improved link conveyor which is substantially totally enclosed at the sides and ends for assuring against injury to operating personnel and having a greater load capacity.

A still further object of this invention is to provide a simplified and improved link structure for an endless conveyor belt.

Further objects and advantages of this invention will become apparent from the following description referring to the accompanying drawings and the features of novelty which characterize this invention will be pointed out with particularity in the claims appended to and forming a part of this specification.

Referring to the drawings, an embodiment of an improved endless belt conveyor made in accordance with this invention is illustrated in FIGS. 1-9 in which a substantially continuous flat load-supporting surface is provided by an improved and simplified endless belt structure. This endless belt structure comprises a plurality of longitudinally serially arranged link which are hingedly connected together and adapted to be supported and driven by a suitable supporting and driving mechanism. In this construction, the elements of the conveyor belt are formed and arranged to minimize openings in the structure and to provide substantially closed and continuous external surfaces, which also provide for a maximum of safety for operating personnel. The links of the conveyor belt each is formed with a continuous flat load-supporting central portion of substantially uniform width, with a plurality of transversely spaced curved tongues extending on each side of the central portion in a direction away from the load-supporting surface and spaced apart substantially the transverse width of a tongue.

Figures 1, 2, 3:
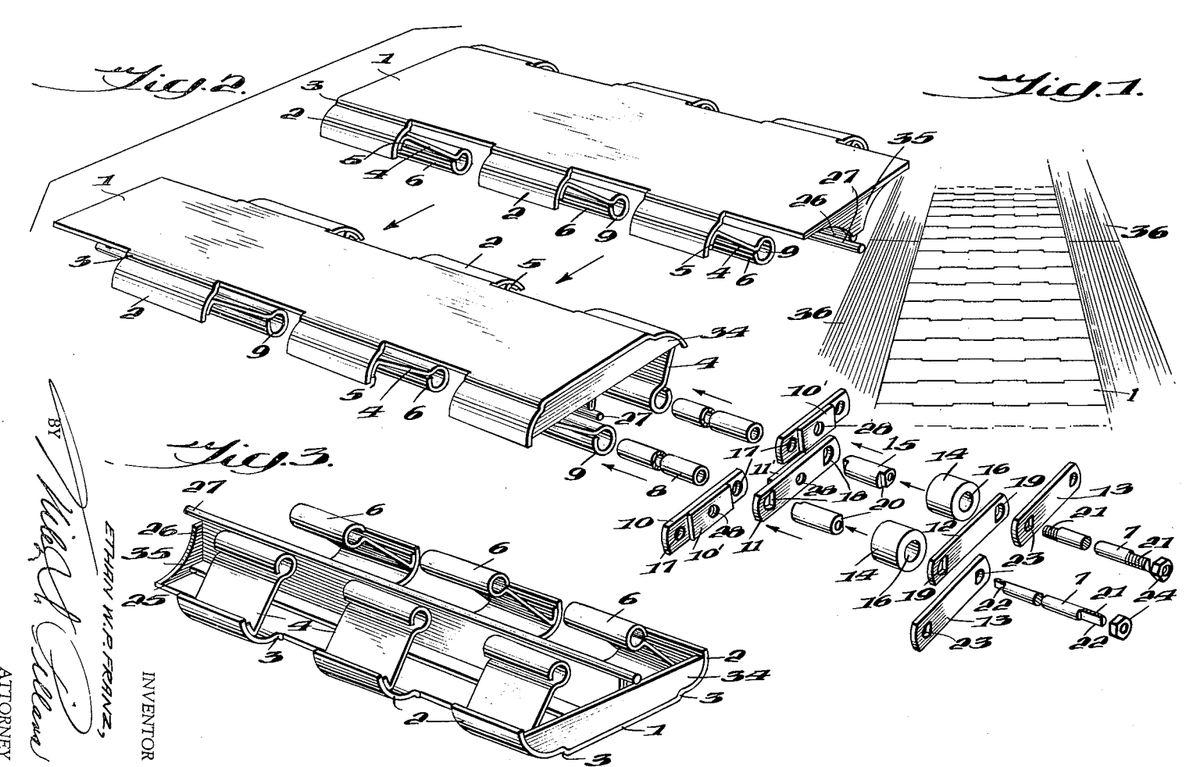
FIG. 1 is a perspective view of an embodiment of this invention illustrating the general layout of an endless belt conveyor mounted to provide a load-supporting surface substantially flush with adjacent floor surfaces to facilitate traversing of the conveyor by other equipment.
FIG. 2 is an exploded perspective view of two links and part of a supporting and driving chain at one side of the links illustrating one embodiment of this invention.
FIG. 3 is a perspective view of the underside of one of the links shown in FIG. 2.
Figures 4, 5:
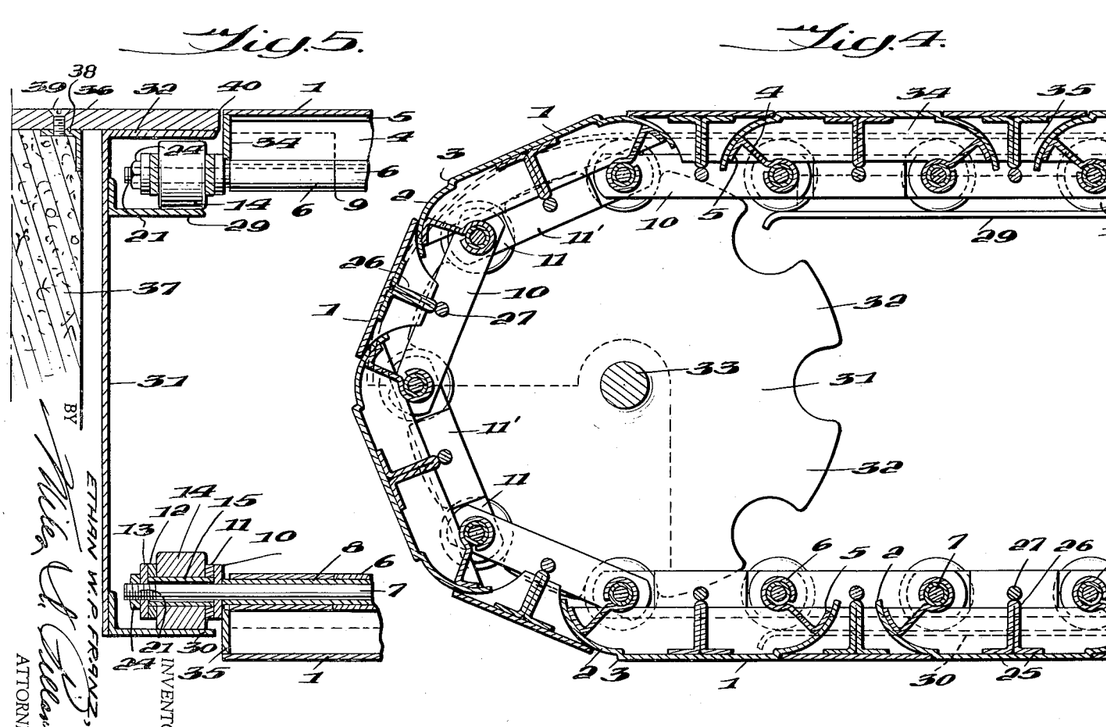
FIG. 4 is a longitudinal elevational sectional view through an end of an improved conveyor belt of a type utilizing link and chain structures such as those shown in FIGS. 2 and 3.
FIG. 5 is an elevational view in transverse section of a part of the supporting arrangement of one side of an improved conveyor embodying this invention and arranged to provide a load-supporting surface substantially flush with an adjacent floor surface, of the type shown in FIG. 1.

The detailed construction, arrangement and relationship between adjacent links provides the desired improved continuous surface of the belt, both for the straight and curved stretches thereof, and provides for a substantially stronger construction and greater load-supporting capacity. FIG. 1 illustrates an arrangement wherein the flat load-carrying surface of such a belt is arranged substantially flush with adjacent floor surfaces, thereby providing for traversing of the belt by other devices without the need of lifting or lowering of the devices in so crossing the belt surface. The particular mounting which supports a belt in this manner may be varied in accordance with the structure of the building in which the belt is located, and FIG. 5 illustrates one method for mounting a belt in this manner.

Figure 6:
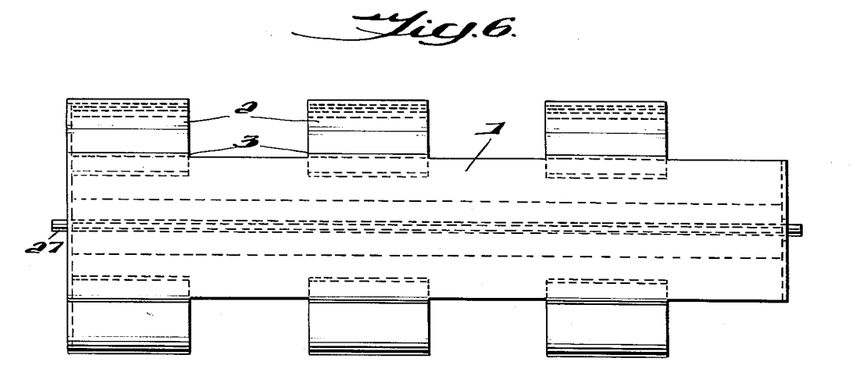
FIG. 6 is a top plan view of an improved conveyor link such as that shown in FIGS. 2, 3, and 4.
Figure 7:
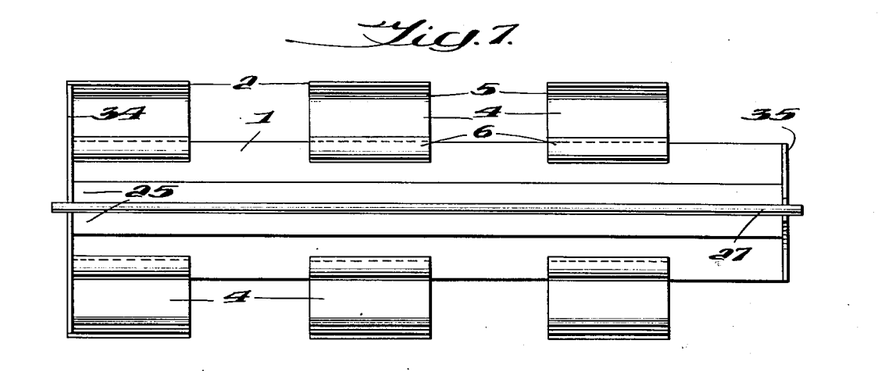
FIG. 7 is a bottom plan view of the link shown in FIG. 6.
Figure 8:
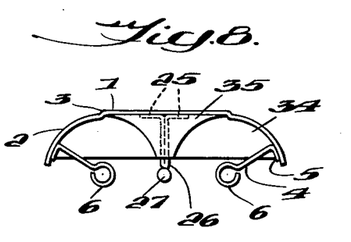
FIG. 8 is an end elevational view of the link shown in FIGS. 6 and 7 as seen from the right-hand side of these figures.
Figure 9:
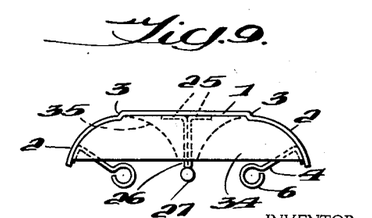
FIG. 9 is an end elevational view of the link shown in FIGS. 6 and 7 as seen from the left-hand side thereof.

In order to provide a substantially continuous outer surface to the belt, both for the relatively flat load-supporting stretches of the belt and for the reverse turns at the ends of the belt, the links of the belt are formed with a central portion 1 which is substantially flat and of uniform width, as is more clearly shown in FIGS. 2, 6, and 7. The width of a link transversely of the belt preferably is made equal to the desired transverse width of the endless belt conveyor and also preferably is made an integral number of times the transverse width of spaced apart tongues 2 which extend on each side of the central portion 1. These tongues 2 are arcuately curved away from the outer load-supporting surface of the central portion 1 and preferably are integrally connected thereto by an offset 3 in the direction of the tongue curvature and of substantially the thickness of the central portion 1.

This embodiment of this invention lends itself particularly well to fabrication from sheet metal parts which can be punched and formed to the desired shapes with a minimum of operations. Each link of this conveyor is formed with the tongues 2 in alignment on opposite sides of the central portion of the link and spaced apart substantially the width of a tongue, so that the links can be assembled in the manner shown in FIG. 2 to provide a belt as shown in FIG. 4. In this assembly, the tongues 2 on adjacent links are interdigitated and extend under adjacent flat central portions of adjacent links, thereby forming a substantially continuous belt surface for both flat and curved stretches of the belt. The advantage of the offset connection of the tongues 2 to the central portion 1 is best seen in the sectional view in FIG. 4, which illustrates how the flat central portions of adjacent links fit closely over the curved tongues to form the desired continuous belt surface. This not only minimizes the entrance of foreign matter into the belt and between links of the belt thus greatly facilitating the diverting or plowing off of articles from the belt, but also minimizes the interference of depressions in the belt surface with the steady mounting of articles on the belt and facilitates the traversing of the belt by carriers, such as trucks and dollies.

Desirable flexibility is provided to the belt to allow for forming the return loops at each end of the conveyor by hingedly securing together adjacent links by a plurality of inwardly angularly extending hinge plates 4 secured to the underside of each of the tongues 2. This can conveniently be done by placing flanges 5 formed on the ends of the hinge plates in intimate contact with the inner surfaces of the tongues 2 and suitably welding them together, as by projection welding. The inner transverse edge of each hinge plate 4 is formed with a hinge loop 6 which extends transversely of the plate parallel to the load-supporting central portion 1 of the hinge. These hinge loops 6 are adapted to be arranged in interdigitated axial alignment with hinge loops 6 on adjacent link tongues forming sets of transversely aligned hinge loops which provide a substantially continuous transverse channel for the reception of a suitable hinge connecting member. In order to provide an efficient and long-wearing hinged connection between adjacent belt links, each aligned set of interdigitated hinge loops 6 is connected together by a hinge pin 7 fitted into a tubular bushing 8 which extends transversely of the belt and is closely fitted into the hinge loops 6. This forms a sturdy connection between adjacent links, with adjacent ends 9 of the hinge loops 6 in movable bearing engagement with corresponding ends 9 of axially adjacent hinge loops, which minimizes relative axial movement between adjacent hinge loops and assures the proper axial alignment of adjacent links.

The belt is adapted to be supported and driven in any suitable manner, and preferably is provided with an endless chain arranged on each side of the conveyor belt secured to the belt primarily through the hinge pins 7. The endless chain on each side of the belt may take the form illustrated in which a plurality of pairs of transversely spaced sets of inner bars 10 and 11 and other bars 12 and 13 cooperate with rollers 14 in supporting and driving the belt. These chains bars are longitudinally arranged adjacent to each outer side of each belt link, as is more clearly shown in FIGS. 2, 4, and 5, with the supporting rollers 14 arranged between the inner and outer sets of chain bars.

In order further to minimize wear of the moving parts of the conveyor structure, a short tubular bushing 15 is arranged in a central aperture 16 in each roller 14 for rotatably supporting the roller. This roller mounting co-operates with the chain bar mountings to provide an efficient smoothly operating drive chain, in which each end of the chain bars is formed with an aperture therethrough to provide for the passage of the hinge pin 7. Apertures 17, in the innermost chain bar 10, are formed round and of a size just sufficient to receive the hinge pins 7, and the inner and outer chain bars 11 and 12 are formed with key locking apertures 18 and 19, respectively, into which notched ends 20 of the short bushings 15 are nonrotatably fitted.

The entire assembly of link belt and supporting chains is provided with the desired flexibility by hingedly securing these members together by the hinge pins 7. These pins are formed with threaded ends 21 having flat notches 22 and nonrotatably extend through key locking apertures 23 in the ends of the outermost chain bars 13 and are secured in position by suitable nuts 24. These nuts are drawn up until the ends of the bushings 8 engage the inner surfaces of the innermost chain bars 10, thus providing the proper spacing between the chain bars on each side of each link and minimizing friction between the bars and the rollers 14.

In order to provide a stronger link belt, each belt link preferably is provided with a reinforcing member extending transversely across the link and suitably secured thereto. This reinforcing member may be fabricated from a flat sheet-metal strip formed into a substantially T-section bar, with flanges 25 forming the top of the bar secured to the underside of the central portion 1 of the link, and with side webs 26, forming the leg of the T, extending substantially perpendicularly inwardly therefrom. This provides additional rigidity to the load-supporting central portion 1 and aids in distributing the load more evenly on each link.

For certain heavy load installations, a stronger conveyor may be required. This can conveniently be provided by reinforcing the belt links and supporting driving chains and by more evenly distributing the belt load on the chains. Reinforcement of the belt links may comprise a reinforcing and force-transmitting round bar or pin 27 secured to the inner edge of the inwardly extending webs 26 of the reinforcing member and preferably welded thereto throughout its length. When used, this pin 27 is made slightly longer than the reinforcing webs 26 and extends transversely of the belt link slightly beyond the outer side edges thereof. The inner bars 10 and 11 of the supporting chains are reinforced by plates 10′ and 11′, respectively, secured, as by welding, to the chain bars, and the ends of the belt reinforcing pins 27 are adapted to have a supporting engagement with the adjacent inner bar 10 or 11 in apertures 28 extending through the bars and reinforcing plates. This provides for a further even distribution of the load from the central load-supporting portion 1 of each link through the reinforcing member and the pin to the supporting chains on each side of the conveyor belt.

Suitable supporting tracks 29 and 30 are mounted on a supporting frame, which may comprise any proper supporting and enclosing structural member 31. This structural member 31 preferably includes a side closure portion and an upper housing flange 32, which extends over the upper portion of the supporting chain and substantially encloses the chain so as to minimize the entrance of foreign matter into the interior of the conveyor belt and also to provide for the maximum safety of operating personnel by minimizing the possibility of contact of personnel with the operating portions of the conveyor belt. The supporting tracks 29 and 30 provide an arrangement for carrying the endless conveyor belt and also guiding it in the desired manner through its longitudinal substantially flat stretches and guide the rollers 14 towards suitable driving members arranged at the looped ends of the belt. These driving members may suitably take the form of sprocket wheels 31 having teeth 32 thereon which extend between the inner and outer sets of chain bars. The spaces between the sprocket teeth 32 form roller seats, which are engaged by the rollers 14 at each end of the endless belt and are adapted to drive the belt through the rollers, while supporting and guiding it in its travel from one direction around the end loop of the belt to its return travel position. This is more clearly illustrated in the sectional view in FIG. 4. In order to equalize the driving force on the conveyor belt and to maintain substantially parallel alignment of the belt links, a sprocket wheel 31 preferably is arranged on each side of the return loop of the conveyor belt and these sprocket wheels are conveniently mounted on a suitable drive shaft 33 rotatably supported in suitable bearings and driven from any desired source of power.

In order further to provide the maximum safety to operating personnel and to minimize maintenance and repairs of the conveyor, the sides of the belt links preferably are substantially enclosed by relatively long and short longitudinally extending end plates 34 and 35, respectively, suitably secured to the belt links, as by line welding along the edges of these end plates to the adjacent surfaces of the link and to the reinforcing member and hinge plates. These end plates preferably extend inwardly slightly beyond the outer edges of the adjacent inner chain bars 10, so as to provide a maximum closure and a minimum of friction between relatively movable parts.

As is more clearly shown in FIG. 5 when it is desired to provide an arrangement in which the load-supporting surface of the conveyor belt is substantially flush with adjacent floor surfaces the side frame 31 extends upwardly to a distance slightly short of the upper surface of the conveyor belt links, so as to provide for the arrangement of a suitable antiskid walk-way plate 36 above the transversely extending cover flange 32. The walk-way plate 36 may be suitably supported on any desired frame structure, such as a wall 37 provided with a channel section edging bar 38, to which the walk-way plate 36 is suitably secured by a plurality of screws 39. The walk-way plate 36 and the supporting wall 37 are formed and arranged such that the antiskid upper surface of the plate 36 is substantially flush with the load-supporting surface of the central portion 1 of the belt links, and the inner edge 40 of the walk-way plate 36 preferably is arranged with a relatively small clearance between it and the adjacent edge of the conveyor belt. This improved belt structure thus provides a construction on which relatively heavy loads may be effectively transported by the belt with a minimum of interference between the load and the belt, a maximum of safety for operating personnel, and a maximum of ease for traversing and loading of the belt from adjacent floor surfaces.

FIGS. 10–15 illustrate another embodiment of the present invention. In this construction, the endless belt conveyor is of the same general type as that shown in FIGS. 1–9, and includes a modification of the conveyor belt links which can be manufactured and maintained more economically from a minimum of standard parts and which is more readily adaptable to the fabrication of a relatively long link unit, which can be cut to varying sizes to form the desired width of a conveyor belt. In addition, the link structure in this embodiment lends itself more readily to the construction of all of the links in the same manner, and may utilize a reinforcing member which is adapted further to increase the load-carrying capacity of the conveyor belt structure.

As in the previously described construction, the conveyor is adapted to utilize an endless conveyor belt formed of a plurality of longitudinally serially arranged links which are hingedly connected together. Each of these links is provided with a continuous flat load-supporting central portion 41 of substantially uniform width and formed with a plurality of transversely spaced arcuately curved tongues 42, which extend on each side of the central portion in a direction away from the upper load-supporting surface thereof. The tongues 42 are spaced apart substantially the transverse width of a tongue and, in this construction, are arranged in staggered relation on opposite sides of the link, and each is integrally connected to the central portion 41 thereof by an offset 43 in the direction of the curvature of the tongue. Also, as in the previously described construction, adjacent links are adapted to form a substantially continuous belt surface both for the flat and for the curved portions of the belt. In order to assure such a surface, wherein there will be a minimum of openings between adjacent links to exclude foreign matter from entering between the links and to facilitate diverting and plowing material off the belt, the offset 43 is formed substantially the thickness of the material of the flat central portion 41 of a link and the tongues 42 extend under the adjacent central portion of the adjacent links. This is best illustrated in the side elevational view shown in FIG. 10.

In order to provide a maximum flexibility to the belt with a maximum strength and uniformity of load distribution, the tongues 42 of adjacent links are interdigitated and are adapted to be hingedly connected together in a manner similar to the first described construction. The hinged connection of tongues on adjacent links is formed through hinge plates 44, which are secured to the undersides of the tongues 42 in any suitable manner, as by line, spot, or projection welding of curved flanges 45 formed on the ends of the hinge plates 44 to to the tongues 42. The inner edge of each hinge plate 44 is formed with a hinge loop 46 arranged in interdigitated axial alignment with hinge loops 46 on adjacent link tongues, forming sets of transversely aligned hinge loops. These hinge loops 46 are connected together and reinforced by a suitable longitudinally extending bushing 47, which extends therethrough for the width of each link and is adapted to receive a suitable hinge pin 48 which forms the main force-transmitting element between the link belt and the supports for the belt.

The endless link belt is adapted to be supported and driven by a suitable endless chain arranged on each side of the link belt and connected thereto through the hinge pins 48. Each of these chains may comprise a plurality of pairs of transversely spaced inner bars 49 and 50 and outer bars 51 and 52, longitudinally arranged adjacent to each outer side of each of said belt links. The ends of longitudinally adjacent pairs of chain bars are arranged in overlapping relation and are formed with apertures extending therethrough which are adapted to receive threaded ends of the hinge pins 48. A roller 53 is positioned between the overlapped ends of the inner bars and the overlapped ends of the outer bars of the chain and are adapted to support the belt on a suitable track 54. Nuts 48' threadedly engage the ends of the hinge pins 48 and secure the belt and chains in assembled relation. As in the previously described construction, the link belt may be driven by any suitable means, such as a sprocket wheel, similar to that shown in the FIG. 4 construction.

In order further to increase the load-carrying capacity and to distribute the load more evenly of each link and on the chains on both sides of the belt, a reinforcing member is provided which extends transversely across each link and is secured to the underside of the central portion 41 thereof. Each of these reinforcing members preferably is formed of a strip of sheet-metal fabricated into a U-section member and arranged to extend transversely across each link, with flanges 55 on the ends of side webs 56 in engagement with the underside of the central portion 41 of a link and suitably secured thereto, as by line, spot, or projection welding. The webs 56 of the reinforcing member extend substantially perpendicularly to the flanges 55 and to the load-carrying central portion 41 of each link, and inwardly of the bars of the endless chains on each side of the belt.

For high load capacity installations, additional reinforcement and load distribution features can be provided. These may comprise a load-transmitting and distributing pin connection formed between the link reinforcing member and the innermost adjacent bar of the supporting chains. In this construction, a round bar or pin 57 is arranged at each end of each link and which is securely mounted in an inverted U-bracket 58 secured to the inner ends of the reinforcing member, as by line or spot welding the bracket to the webs 56 and to the reinforcing member base 58. The pin 57 at each end of the reinforcing member projects transversely beyond the ends of the member and is adapted to have a supporting engagement with an aperture 60 in the innermost adjacent supporting chain bar 49 or 50. In order further to make all parts of this improved chain construction interchangeable and to distribute the load more evenly on the chain, the bars 49 and 50 are formed with reinforcing plates 61 and 61' through which the ends of the pins 57 also extend. These reinforcing plates 61 and 61' also aid in maintaining the proper spacing for both sides of the rollers 53, as is more clearly shown in FIG. 11.

The safety of operating personnel from injury by contact with the driving parts of this belt construction also is assured by providing an end plate 62 over each end of each link. The staggered arrangement of the tongues on opposite sides of each link presents the same outline at both ends of a link, so that the end plate at both ends can be made exactly alike. If a link has the same number of tongues on both sides, the end plates are simply reversed in direction at opposite ends; and if one side has more tongues than the other, the end plates are exactly alike in arrangement at both ends of a link. These end plates are secured to the links in any suitable manner, as by line welding the edges of the end plates to the adjacent surfaces of the belt links and hinge plates. Preferably, these end plates 62 extend inwardly to substantially the same extent as the curved tongues 42, and thus further assure against the entrance of foreign material into the sides of the conveyor belt. This construction thus provides for a maximum safety to the operating personnel, greatly increases the load carrying capacity of a belt, provides for a substantially continuous outer conveyor belt surface, and provides for a most efficient fabrication of the belt by reason of a complete interchangeability of all links and parts and by reason of the adaptability of the preforming of strips of link material which can be cut into suitable lengths to form the desired width of conveyor belt.

Figures 15, 16:
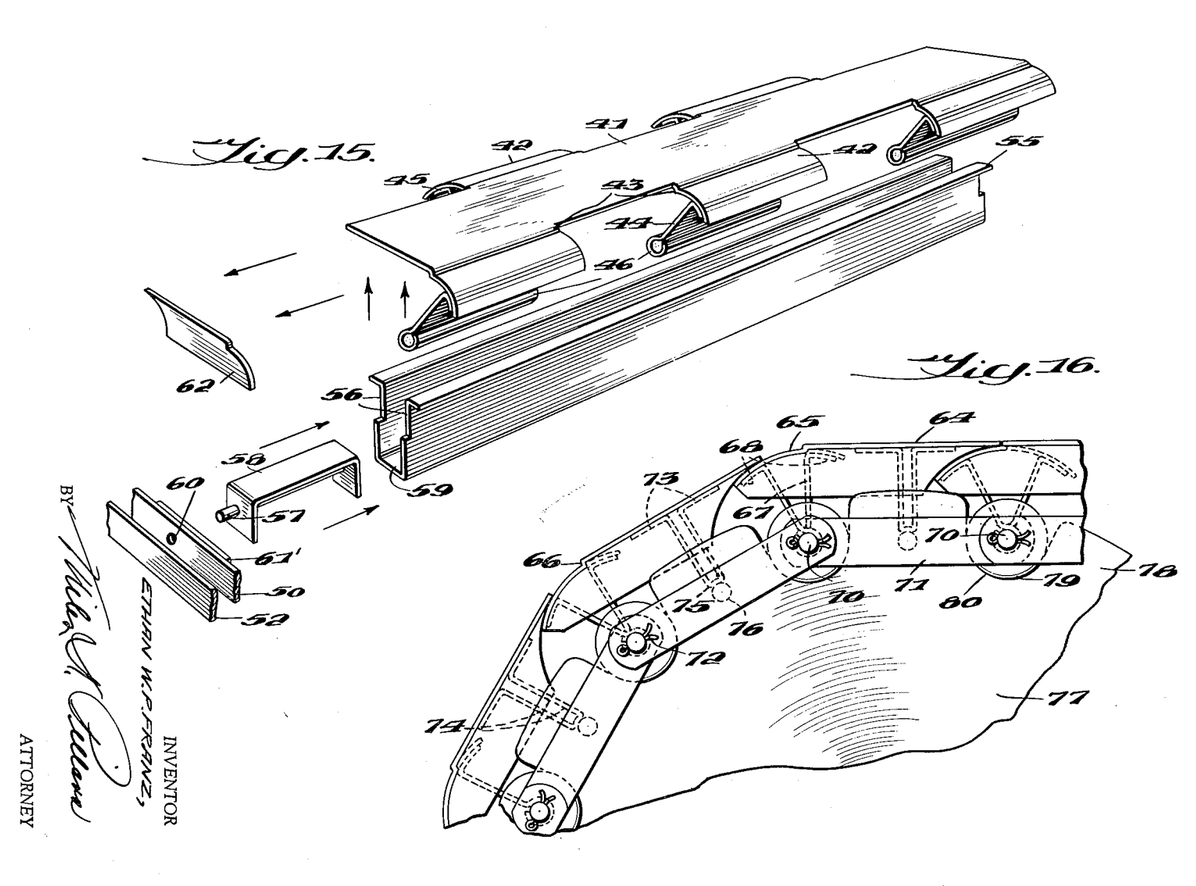
FIG. 15 is an exploded perspective view of the link shown in FIGS. 12, 13, and 14 and a fragmentary portion of the bars of an associated driving and supporting chain of the type shown in FIGS. 10 and 11.
FIG. 16 is a fragmentary side elevational view of the end portion of another embodiment of an improved link belt conveyor constructed according to this invention.

In certain applications, it may be found desirable to combine some of the detail features of the first and second previously described embodiments of this invention in order to produce desirable improved and novel endless load-supporting belts. FIG. 16 illustrates such a combination. In this embodiment of the present invention, an endless conveyor is formed comprising a load-supporting belt having a plurality of longitudinally serially arranged links, each of which includes a load-supporting central portion 64 of substantially uniform width, with a plurality of transversely spaced curved tongues 65 on each side thereof extending away from the load-supporting surface. As in the previously described construction, the tongues of adjacent links are interdigitated and extend under adjacent central portions of adjacent links forming a substantially continuous belt surface. These tongues 65 preferably are arranged in staggered relation on opposite sides of the link, in the same manner as is shown in the exploded view in FIG. 15, and are spaced apart on each side of the link substantially the transverse width of a tongue. As in the previously described embodiments, these tongues 65 are integrally connected to the central portion of each link by an offset 66 in the direction of tongue curvature which is substantially the thickness of the flat central portion 64 of a link. Longitudinal adjacent links are hingedly secured together through hinge plate members 67, which are rigidly secured to the undersides of the curved tongues by flanges 68, suitably welded thereto. The inner transverse edges of the hinge plates 67 are provided with hinge loops 69, which also are interdigitated with hinge loops of adjacent links and are hingedly secured thereto by suitable hinge pins 70. A supporting and driving chain is arranged adjacent each longitudinal side of the belt and comprises a plurality of spaced bars 71, which are hingedly secured together and to adjacent belt links through the ends of the hinge pins 70. These hinge pins are secured against displacement in any suitable manner, as by cotter pins 72.

In order to increase the load-carrying capacity of the belt, and to distribute more evenly the load forces on the belt links and on the driving and supporting chains, reinforcing members are provided which extend transversely under the central portion 64 of each belt link. These reinforcing members preferably are formed of sheet-metal fabricated into a substantially U-section member and provided with longitudinally extending flanges 73, which are adapted to be secured to the underside of the central portions 64 of the links by suitable spot or line welding. The U-section reinforcing member comprises webs 74 which extend substantially perpendicularly to the flanges 73 and are united together at the opposite ends thereof by a base 75. A force-transmitting and strengthening circular rod or pin 76 is rigidly secured to the base 75 of the reinforcing member, by suitable spot or line welding, and is slightly longer than the reinforcing member and the links of the endless belt, so that the ends of the pins 76 project outwardly past the side edges of the belt. These ends of the pins 76 extend into apertures formed substantially centrally of adjacent chain bars 71 and have a supporting engagement therein for transmitting load forces from the belt links to the chain bars. In this manner, the load on the conveyor belt is transmitted to the supporting chains on each side of the belt through the reinforcing member and the pins 76 and also through the hinge plate members and the hinge pins 70.

As in the previously described embodiments, a pair of suitable sprocket wheels 77 are arranged on each side of each return loop of the conveyor belt and are provided with sprocket teeth 78 which extend between spaced chain bars on each side of the belt and provide supporting and driving seats 79 between the teeth 78 for rollers 80, which are rotatably supported by the hinge pins 70 between pairs of chain bars 71. This arrangement of sprocket wheel rollers and chains provides for the desired support, drive, and guiding of the conveyor belt at each return end loop thereof. In certain instances it may be found desirable to drive only one set of sprocket wheels at one return loop of the belt and, in such cases, the sprocket wheels may conveniently form the supporting and guiding means for the conveyor belt at the end thereof which is not driven.

Figure 17:
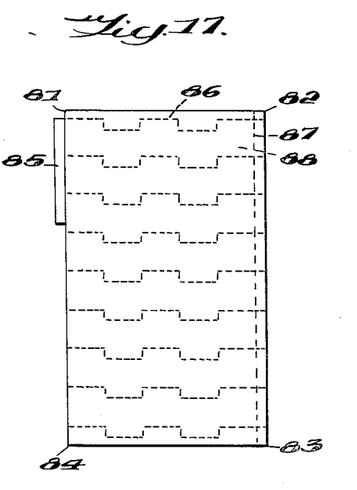
FIG. 17 schematically illustrates the manner in which a strip of sheet metal can be very efficiently cut to provide the desired belt link blanks of a type embodying this invention.

The staggered tongue arrangement, illustrated in the embodiments of FIGS. 10-16, also lends itself to further manufacturing economies which can be more easily understood by reference to FIGS. 17-20. In FIG. 17 is shown a strip of sheet-metal 81—82—83—84 from which belt link blanks are to be cut. In making the link blanks, this sheet is aligned with one edge along a guide bar 85 and is then cut as indicated at the dotted line 86. The right-hand edge is then trimmed or cut to the dotted line 87. The sheet is next moved up the length of a blank and the cutting or punching steps are repeated, thus completing the cutting of a blank. The staggered tongue arrangement makes possible this repetitive cutting pattern irrespective of the number of tongues across each link as all such links are identical and adjacent ends of adjacent links are always alike for any given belt. It is seen, therefore, that the only waste material is that small section at the start and end of each sheet between the end edges and the first and last cuts and the material trimmed off along the side edge to give the desired width to the blank. This results in a simple cutting operation and a maximum utilization of the sheet material during the blanking steps in fabricating the belt.

Figure 18:
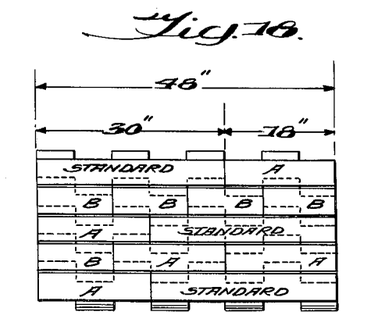
FIG. 18 schematically illustrates the manner in which a belt embodying this invention can efficiently utilize a standard link blank, made in accordance with the method illustrated in FIG. 17, to provide a belt of greater width than the width of a link blank.
Figure 19:
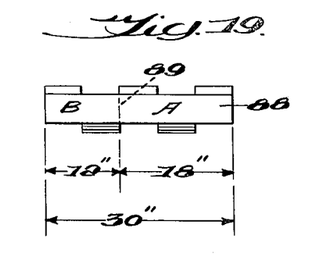
FIG. 19 schematically illustrates the manner in which a link blank, of the type shown in FIG. 17, can be cut into segments to form a belt such as that illustrated in FIG. 18.

Furthermore, links of any desired transverse dimension or number of tongues can be made by a simple cutting of a standard link blank to the desired number of tongues or the addition of the desired number of tongues to a standard blank. For example, a blank 88 having five tongues, as in the FIG. 17 embodiment, can be used economically in a belt having two, three, or four tongue links by simply cutting the five tongue blank. It also can be used as a five tongue link and can be combined very economically to give an eight tongue belt as shown in FIG. 18. These two, three, four, and eight tongue belts can be obtained by simply cutting the standard five tongue link 88 along dotted line 89, FIG. 19, into segments A and B and arranging the segments as shown in FIG. 18. Other combinations can also similarly be made according to this improved method to provide a belt of any desired width and number of tongues. Combinations of link segments preferably utilize a staggered arrangement of joints and may follow any desired pattern. The FIG. 18 arrangement utilizes all segments in a repetitive pattern every six links. In the illustration, if each tongue be made six inches wide, belts of 12, 18, 24, 30, and 48 inches wide can thus be made with great economy and ease, using two, three, four, five, and eight tongues across a belt width.

Figure 20:
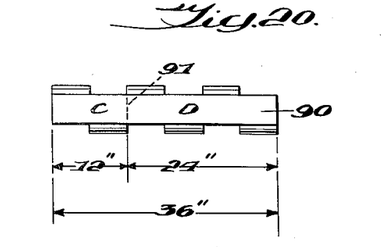
FIG. 20 schematically illustrates another link blank similar to that in FIG. 19 and having a greater number of tongues which also is adapted to be utilized for a very economic assembly of a belt having a greater width than the width of the link blank.
Figure 21:
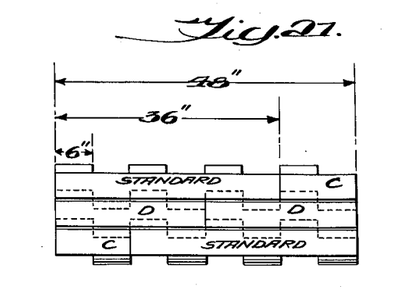
FIG. 21 schematically illustrates a section of a belt, similar to that in FIG. 18, utilizing a link of the type shown in FIG. 20.
Figure 22:
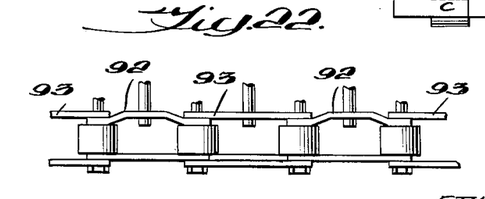
FIG. 22 is a plan view of a section of a modified supporting and driving chain, which may be utilized with any of the pin reinforced links illustrated in other figures of the drawings.

If a wider strip of sheet material be used and six tongues be cut per link blank, as shown in FIG. 20, it can similarly be used economically to make two, three, or four tongue links by simply cutting the six tongue link, used as a six tongue link, or combined as shown in FIG. 21 to provide an eight tongue link. The latter can be made by combining the standard six tongue link with two and four tongue segments C and D, obtained by cutting a blank 90 along dotted line 91, FIG. 20, to give a belt with staggered joints, as shown in FIG. 21. This arrangement also lends itself to a very economical use of material. The illustrations suggest six inch tongues, but any suitable dimension may be utilized. This six tongue blank also can be used to make other combinations of link segments, as with a five tongue or other size blank, economically to provide any desired belt width.

Figures 10, 11:
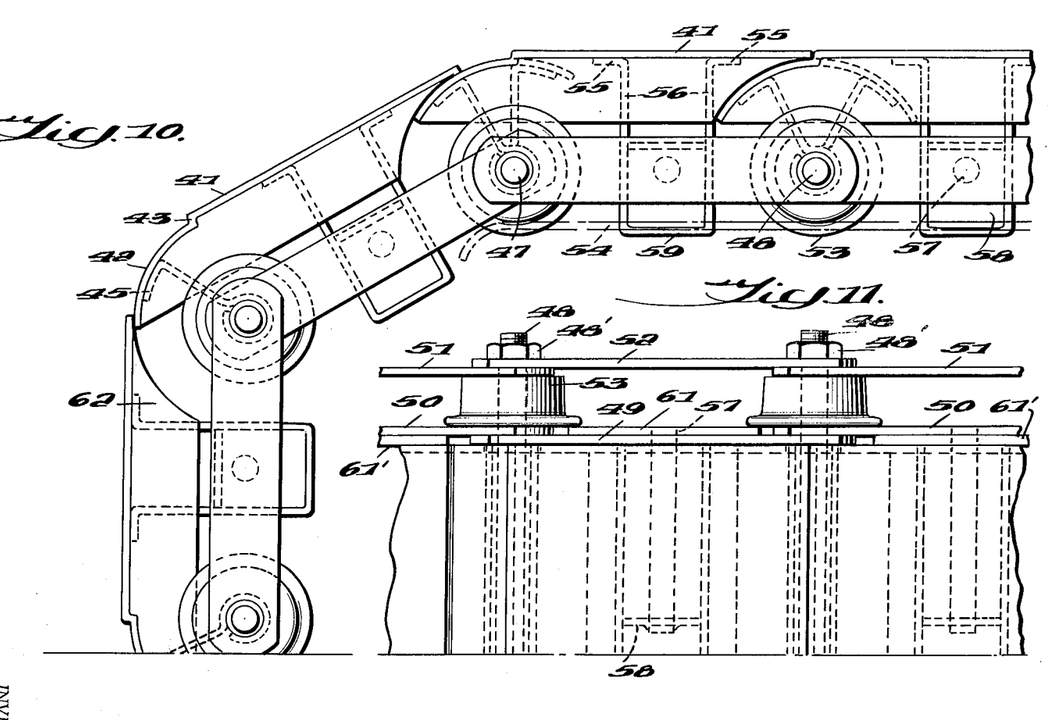
FIG. 10 is a side elevational view of a part of the end of a link belt conveyor made in accordance with another embodiment of this invention.
FIG. 11 is a fragmentary plan view of one side of the belt shown in FIG. 10.
Figure 12:
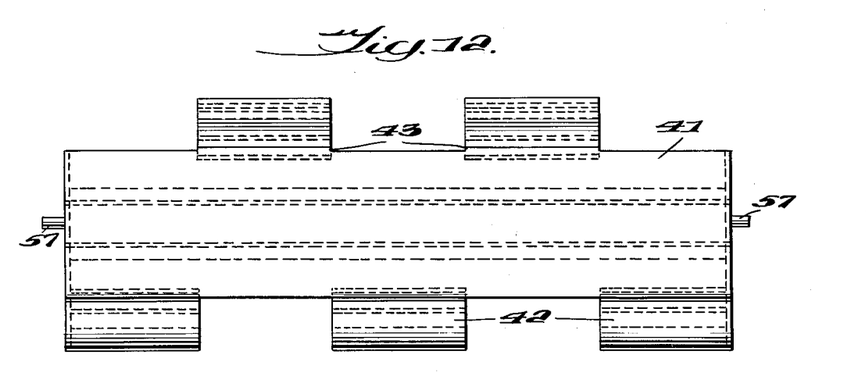
FIG. 12 is a top plan view of a link for a conveyor belt of the type shown in FIGS. 10 and 11.
Figure 13:
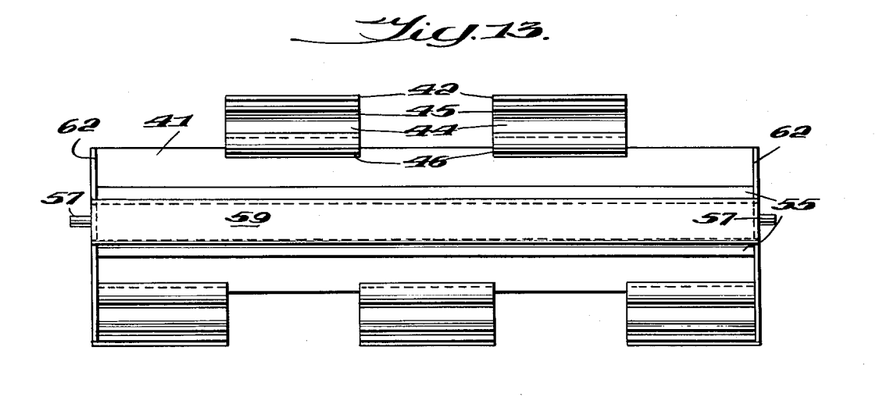
FIG. 13 is a bottom plan view of the link shown in FIG. 12.
Figure 14:
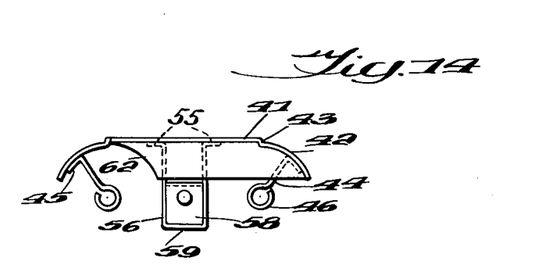
FIG. 14 is an end elevational view of the link shown in FIGS. 12 and 13.

The construction of links, pivotally secured together by a pin which extends through a unitary tubular bushing mounted in hinge loops, as shown in FIGS. 2, 4, 5, 10, 11, and 16, further assures a strong aligned arrangement of segmental link belts of the FIGS. 18 and 21 type. Belts of the types illustrated, may be made without the pin reinforcing structure where the extra rigidity and strength provided by this feature is not required. Also, if the loads to be carried do not require the supporting chains to be reinforced as illustrated in FIGS. 2, 4, and 11, alternate inner belt bars 92 can be offset at the central part, so that this portion having the pin supporting aperture is longitudinally aligned with the intermediate inner chain bars 93. This type chain can be used with any of the pin reinforced type links, where a lighter chain will adequately support the loads.

While particular embodiments of this invention have been illustrated and described, modifications thereof will occur to those skilled in the art. It is to be understood, therefore, that this invention is not to be limited to the particular arrangements disclosed, and it is intended in the appended claims to cover all modifications within the spirit and scope of this invention.

I claim:

1. An endless load-supporting belt comprising a plurality of longitudinally serially arranged sheet-metal links, each of said link having a continuous central portion with a flat load-supporting surface of substantially uniform width, a plurality of transversely spaced arcuately curved tongues extending on each side of said central portion, said tongues being spaced apart substantially the transverse width of a tongue and integrally joined to said central portion by an offset in the direction of the tongue curvature substantially the thickness of said sheet metal, tongues of adjacent links being interdigitated in closely abutting relationship and extending under adjacent flat portions of adjacent links with edges of said central portion between tongues fitted above the surfaces of tongues of adjacent links forming a substantially continuous belt surface for both flat and curved stretches of the belt, and means hingedly securing together longitudinally adjacent belt links for relative pivotal movements around axes substantially along the centers of curvature of said curved tongues.

2. An endless load-supporting belt comprising a plurality of longitudinally serially arranged links, each of said links having a flat load-supporting central portion of substantially uniform width with a plurality of transversely spaced curved tongues extending on each side of said central portion and integrally connected thereto by an offset in the direction of tongue curvature of substantially the thickness of said central portion, said tongues being spaced apart substantially the transverse width of a tongue, tongues of adjacent links being interdigitated in closely abutting relationship and extending under adjacent flat portions of adjacent links forming a substantially continuous belt surface for both flat and curved stretches of the belt, means including an inwardly angularly extending hinge plate secured to the underside of each of said tongues with hinge loops on the inner edges thereof in axial alignment with hinge loops on adjacent link tongues for forming sets of transversely aligned hinge loops, and means including hinge pins extending through said sets of aligned hinge loops for hingedly securing together adjacent belt links.

3. An endless load-supporting belt comprising a plurality of longitudinally serially arranged links, each of said links having a central portion with a flat load-supporting surface of substantially uniform width, a plurality of transversely spaced curved tongues on each side of said central portion extending away from said load-supporting surface and integrally connected thereto by an offset in the direction of tongue curvature of substantially the thickness of said central portion, said tongues being spaced apart substantially the transverse width of a tongue, tongues of adjacent links being interdigitated in closely abutting relationship and extending under adjacent flat portions of adjacent links forming a substantially continuous belt surface for both flat and curved stretches of the belt, means including a pair of driving and supporting chains arranged one on each side of said belt, means for hingedly securing together longitudinally adjacent belt links and said belt links to said chains, and a reinforcing member extending transversely of each of said links secured to the underside thereof and having a supporting engagement with chain on both sides of said belt.

4. An endless load-supporting belt comprising a plurality of longitudinally serially arranged links, each of said links having a continuous central portion with a flat load-supporting surface of substantially uniform width, a plurality of transversely spaced curved tongues on each side of said central portion extending away from said load-supporting surface and integrally connected thereto by an offset in the direction of tongue curvature of substantially the thickness of said central portion, said tongues being spaced apart substantially the transverse width of a tongue, tongues of adjacent links being interdigitated in closely abutting relationship and extending under adjacent flat portions of adjacent links forming a substantially continuous belt surface for both flat and curved stretches of the belt, means including a pair of driving chains arranged one on each side of said belt, means for hingedly securing together longitudinally adjacent belt links and said links to said chains, and a reinforcing member extending transversely of each of said links secured to the underside thereof and having a supporting engagement with the driving chain on each side of said belt.

References Cited in the file of this patent

UNITED STATES PATENTS

| | | |
|---|---|---|
| 1,803,367 | Stevenson | May 5, 1931 |
| 1,824,756 | Welser | Sept. 22, 1931 |
| 2,165,395 | MacChesney et al. | July 11, 1939 |
| 2,725,975 | Franz | Dec. 6, 1955 |
| 2,884,118 | Williams | Apr. 28, 1959 |